July 7, 1942.    W. H. GARDNER    2,289,187
FUSED ELECTRICAL TESTER
Filed April 1, 1940
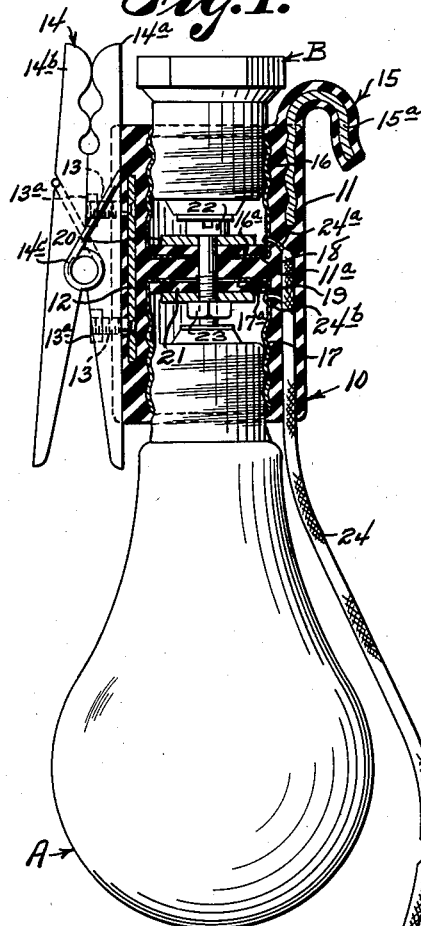
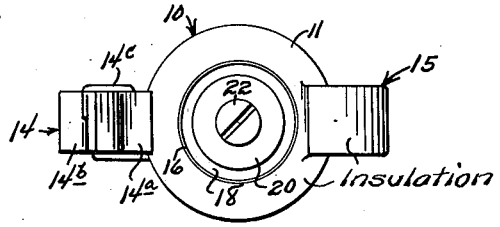
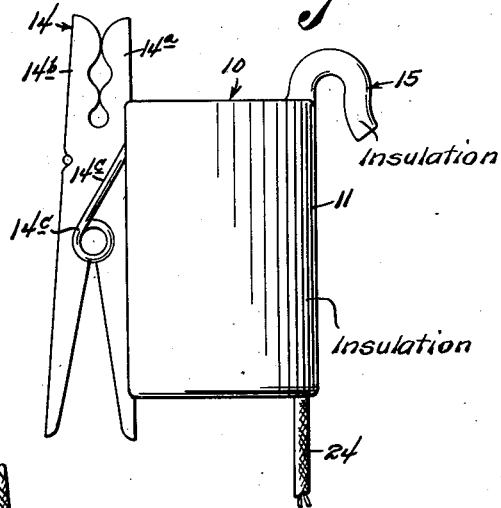
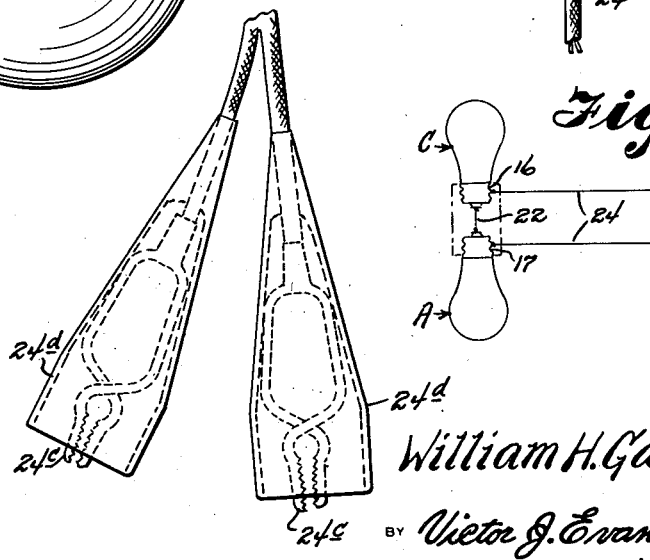
William H. Gardner
INVENTOR
BY Victor J. Evans & Co.
ATTORNEYS Patented July 7, 1942

2,289,187

UNITED STATES PATENT OFFICE 2,289,187

FUSED ELECTRICAL TESTER

William H. Gardner, West Springfield, Mass.

Application April 1, 1940, Serial No. 327,311

2 Claims. (Cl. 175—183)

This invention relates to improvements in electrical testing means and especially is concerned with a novel fused tester.

It is among the important objects of this invention to provide a testing device which includes means mounted thereon for facilitating holding of the tester conveniently upon parts of equipment being tested, thus permitting continued uninterrupted testing with test leads connected directly into circuits.

Another object of this invention is to provide a test lamp having in circuit therewith a fuse whereby overloading of the test circuit is prevented.

A further object of this invention is to provide an assembly comprising interconnected sockets for receiving a fuse and a test lamp or the like and means for holding the assembly upon parts of a device being tested.

A major advantage of the electrical tester according to this invention is that the parts of the device connected in the electrical circuit including the test leads are protectively covered with electrically insulative material, thus preventing accidental short circuit due to touching of parts of the tester against parts of the device being tested.

Noteworthy among the features of the novel tester according to the present invention are its simplicity and ruggedness of construction, the former suiting the device to the requirements of manufacture under conditions of mass production and the latter assuring long useful life.

Other objects, advantages and features of the new and improved tester according to the present invention will be apparent to those skilled in this art during the course of the following description.

Regarded in certain of its broader aspects the novel electrical testing device according to this invention comprises an insulative casing cylindrical in shape and internally divided by a transversely extending partition; a pair of receptacles mounted within said casing one on each side of the partition, said receptacles being connected in series with test leads anchored in the casing side, and tester supporting means on said casing for holding the tester while the device is in use.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Referring then to the drawing:

Figure 1 is substantially a vertical sectional view of the presently preferred embodiment of this invention together with a test lamp and fuse, Fig. 2 is essentially a top plan view of the tester, Fig. 3 is essentially a side elevational view of the tester with parts of the test leads omitted, and Fig. 4 is a circuit diagram of the device.

The electrical tester according to this invention designated in the accompanying drawing by the reference character 10 comprises a yieldable electrically insulative hollow and substantially cylindrical casing 11 internally divided by an integral transversely extending partition-like formation 11a whereby oppositely opening cuplike members are presented substantially as illustrated in the drawing. The casing preferably is formed of material such as semi-hard rubber or the like, which is not easily destructible under conditions of ordinary use to which testing devices of this nature are subjected.

A longitudinally disposed rigid nonyielding bar 12 imbedded in one of the sides of the casing 11 is provided with spaced threaded members 13 extending radially outwardly through the casing side. A clip generally designated by the reference character 14 comprising jaw elements 14a and 14b urged toward each other by a spring 14c is mounted upon the members 13 by means of nuts 13a engaging with the threaded portions of said members whereby the clip is rigidly held upon the casing side essentially as illustrated.

A hook generally designated by the reference character 15 is provided upon the casing 11 in a location diametrically opposite that of the clip 14. The hook comprises, it will be noticed, a rigid nonyielding hook element 15a having a shank extending longitudinally within the casing side and having its projecting parts covered by material from which the casing is formed.

A pair of threaded receptacle sleeves 16 and 17 open at both ends are mounted within the casing 11, one being positioned on each side of the partition-like formation 11a. Washers 18 and 19 of electrically insulative material are provided within the receptacles 16 and 17 engaging with the inturned end portions 16a and 17a thereof respectively and superimposed upon these washers are second washers 20 and 21 through which is passed a bolt 22 which, cooperating with a nut 23 mounted thereon, serves to hold the washers and receptacle sleeves in rigid assembly with respect to the partition-like formation 11a.

A test cable 24 having one of its ends imbedded in a side portion of the casing 11 comprises test lines 24a and 24b which are connected to the sleeves 16 and 17 respectively whereby a circuit is provided including in series the test leads and the receptacles which, when test equipment is positioned in the receptacles, is completed through said equipment by the bolt 22. The test cable terminates at its free end in test clips 24c protectively covered by flexible hollow envelopes 24d essentially as shown.

Having thus described the structural features of the novel electrical tester according to the present invention, its preferred mode of use will now be described from which the advantages of the device will be apparent to those skilled in this art. Assuming it is desirable to use a fused test lamp in testing a circuit, a lamp A is positioned within the receptacle sleeve 17 and a fuse B is positioned within the receptacle sleeve 16. It will be apparent that the lamp and fuse are connected in series with the test leads. The tester is then mounted upon parts of the device being tested either by engaging the hook 15 with a part of the device or by pressing the jaws 14a and 14b of the clip 14 into opened position whereby they may grip a part of the device being tested. The clips 24c are then connected to the lines under test and the test proceeded with in conventional manner. It is to be noticed that the clips may be left upon the lines being tested for any desired period and that the tester during this interval can be held upon the device under test. If for some purpose it is desirable to use two lamps in series, a lamp C may be substituted for the fuse B and the device used as above described.

It is to be understood that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. An electrical tester comprising a casing formed of yieldable electrically insulative material such as rubber or the like, hollow and substantially cylindrical in shape, internally divided by an integral transversely extending partition-like formation; a pair of threaded receptacle sleeves open at both ends, one mounted in said casing on each side of said partition-like formation; a pair of test leads anchored in said casing, each of said leads being electrically connected to a different one of the sleeves; a pair of electrically insulative washers within and engaging with the ends of the sleeves nearest the partition-like formation; and an electrically conductive connector member, passing through said washers and an opening in the partition-like formation, for holding the sleeves within the casing and completing electrical circuit between the test leads and testing devices in the receptacle sleeves.

2. An electric tester, comprising a casing of insulating material substantially cylindrical in shape and internally divided by an integral transverse partition, a threaded sleeve open at both ends and arranged in the casing on opposite sides of the partition, a pair of test leads anchored in the casing, each of said leads being electrically connected to a different one of the sleeves, insulated washers within and engaging with the ends of the sleeves near the partition, a bolt passing through said washers and the partition for holding the sleeves within the casing and completing an electrical circuit between the test leads and the testing device in one of the sleeves and a fuse in the other sleeve, and attaching means adapted to hold the tester upon a device being tested.

WILLIAM H. GARDNER.